United States Patent [19]

Amano et al.

[11] Patent Number: 4,695,234
[45] Date of Patent: Sep. 22, 1987

[54] CENTRAL MECHANISM IN A TIRE VULCANIZING PRESS

[75] Inventors: Itaru Amano, Kobe; Yasuhiko Fujieda; Katsumi Ichikawa, both of Akashi; Masahide Kanzawa, Kobe; Toshio Yanagihara, Kobe; Shikao Misumi, Kobe, all of Japan

[73] Assignee: Kabushiki Kaisha Kobe Seiko Sho, Kobe, Japan

[21] Appl. No.: 837,169

[22] Filed: Mar. 7, 1986

[30] Foreign Application Priority Data

Mar. 29, 1985 [JP] Japan .............................. 60-47150[U]
Apr. 30, 1985 [JP] Japan .............................. 60-65624[U]

[51] Int. Cl.⁴ ........................ B29C 35/00; B29C 33/50
[52] U.S. Cl. ....................................... 425/23; 249/65; 425/52; 425/58
[58] Field of Search ........................ 425/36, 23, 44, 49, 425/51, 52, 53, 58; 249/63, 65

[56] References Cited

U.S. PATENT DOCUMENTS

| | | | |
|---|---|---|---|
| 2,790,205 | 4/1957 | Parker | 425/52 |
| 3,585,686 | 6/1971 | Balle | 425/23 |
| 3,632,712 | 1/1972 | Miller | 425/44 |
| 3,890,073 | 6/1975 | Getz | 425/58 |
| 4,144,007 | 3/1979 | Singh | 425/58 |
| 4,184,823 | 1/1980 | Williams | 425/58 |

*Primary Examiner*—Willard E. Hoag
*Attorney, Agent, or Firm*—Oblon, Fisher, Spivak, McClelland, & Maier

[57] ABSTRACT

A central mechanism in a tire vulcanizing press including a shaping bladder, a hot pressure supply source, an upper bladder clamp supporting center post, a lower bladder clamp supporting post through which is inserted the center post vertically movably, a mechanism for vertically independently moving both posts, and a latch mechanism for preventing the descent of the support post during vulcanizing press for a tire, the latch mechanism being driven selectively in opening and closing directions relative to the support post by means of a latch opening/closing device, the latch opening/closing device including a drive mechanism capable of moving vertically along a vertical axis, member for converting a vertical linear motion of the drive, a mechanism into a rotational motion around the vertical axis and means for transmitting the thus-obtained rotational motion to the latch mechanism. A lower portion of a housing well which surrounds the support post is closed with two upper and lower partition walls which are interconnected in a vertically spaced relation to each other and the space between the partition walls is filled with a heat insulator, and a cylindrical heat insulating structure which surrounds the housing well is attached to the base side of the vulcanizing press.

3 Claims, 11 Drawing Figures

FIGURE 2(A)
FIGURE 2(B)
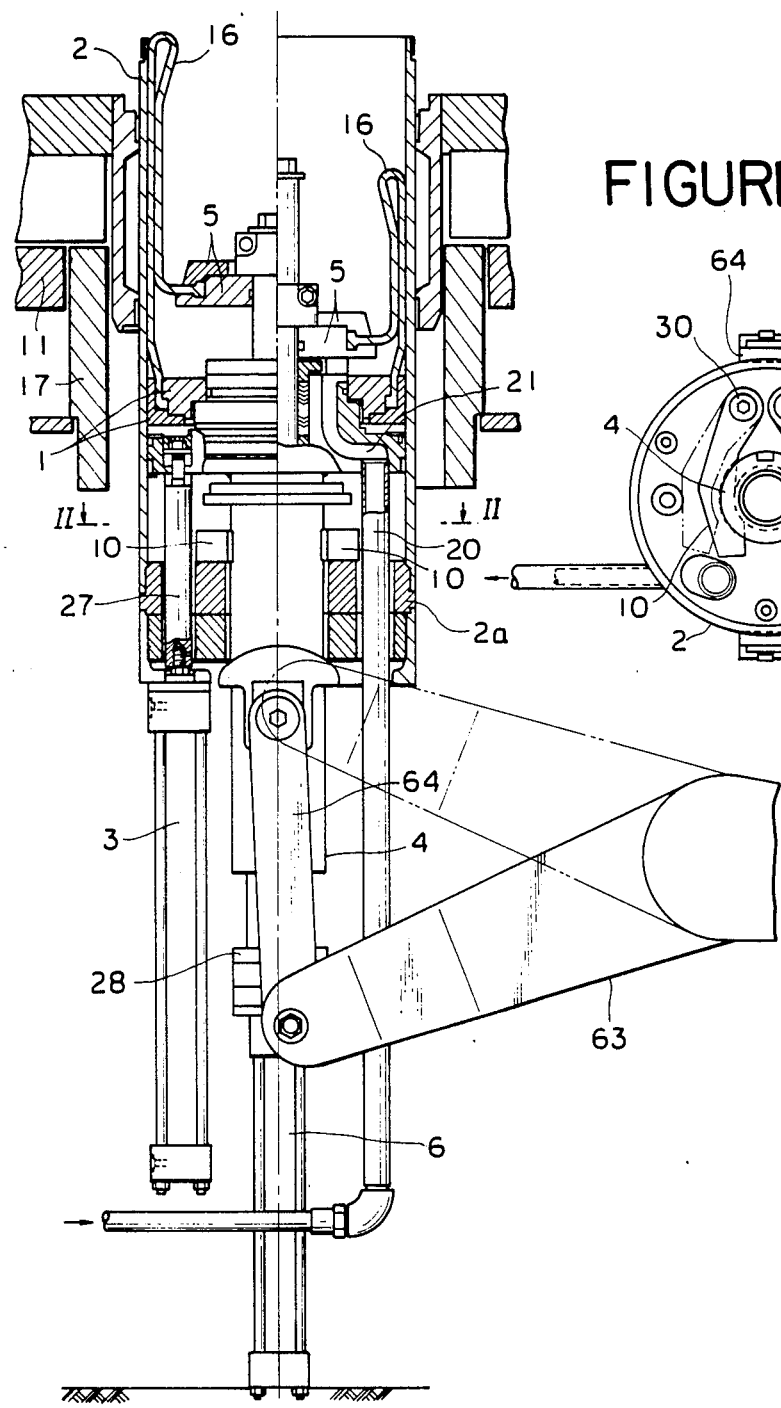
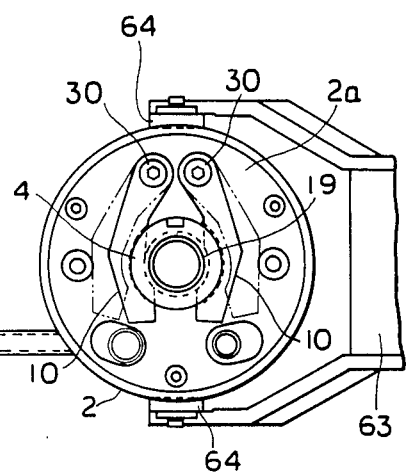

FIGURE 7 *PRIOR ART*
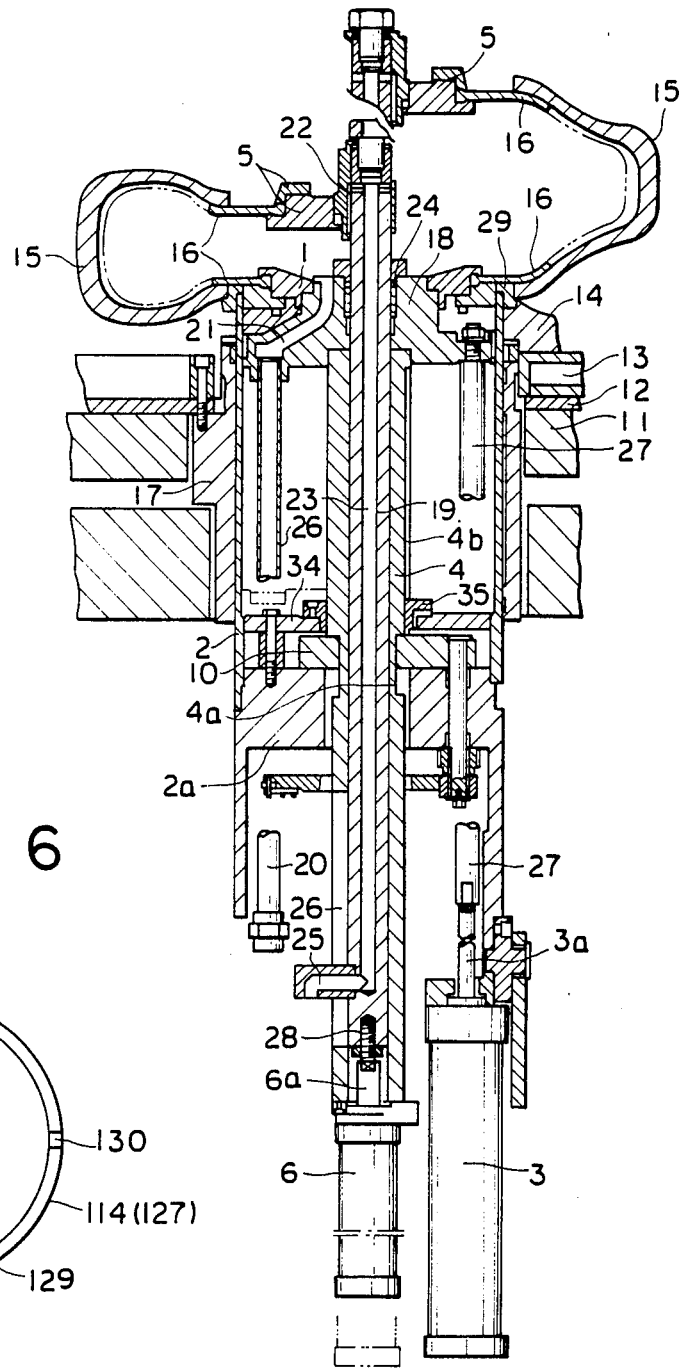
FIGURE 6
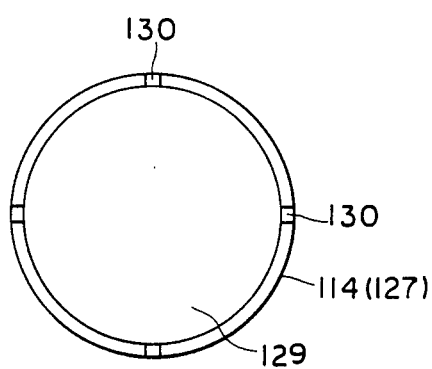

FIGURE 8 *PRIOR ART*
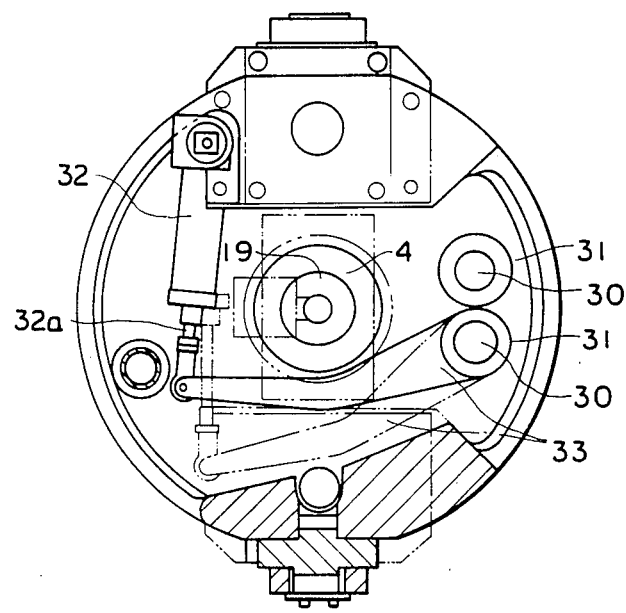
FIGURE 9 *PRIOR ART*
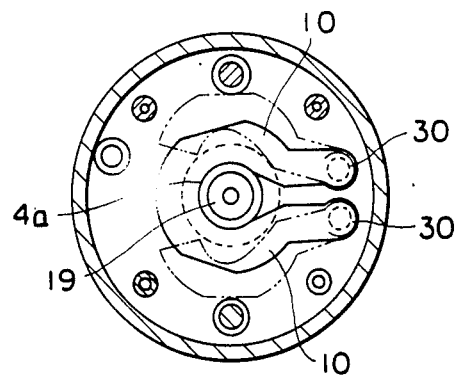

CENTRAL MECHANISM IN A TIRE VULCANIZING PRESS

BACKGROUND OF THE INVENTION

1. Field of the Invention

The present invention relates to a central mechanism in a tire vulcanizing press. More particularly, it is concerned with a central mechanism in a tire vulcanizing press including a latch mechanism for preventing a shaping bladder lower clamp supporting member from being brought down due to a downward internal pressure induced by a hot pressure medium (internal pressure) which is supplied into the bladder during vulcanization of a tire, and also including a heat retaining and insulating device.

2. Discussion of the Background

As well known, a central mechanism in a tire vulcanizing press is provided with means for holding and operating a bladder extensibly and contractibly, the bladder being capable of contacting an inner surface of a green tire, and means for supplying a hot pressure medium (e.g. steam) as an internal pressure medium for a vulcanizing press. According to a principal construction thereof, although there are various types, a lower clamp for the bladder is supported by a hydraulic cylinder and an upper clamp for the bladder is supported by a piston rod of another hydraulic cylinder, the latter cylinder being made movable vertically by a drive means (e.q. a hydraulic cylinder) provided separately, whereby the upper and lower clamps can be vertically moved simultanoeously or separately, thereby permitting operations required of the bladder such as close contact with the inner surface of the green tire, drawing out and extension of the bladder. For supplying a hot pressure medium such as steam into the bladder, a hot pressure medium supply pipe is connected from the interior or exterior of the hydraulic cylinder to a lower clamp supporting structure in the hydraulic cylinder.

During vulcanizing pressing of a green tire, as already known, upper and lower dies are closed and a bladder whose upper and lower clamp portions are supported by a central mechanism and which is in close contact with an inner surface of a tire sealed into the dies, under supply of a hot pressure medium. In this state, an internal pressure induced by the hot pressure medium acts vertically on the upper and lower clamp portions on the central mechanism side positioned at the die center, and the upper and lower clamp portions bear this internal pressure by being supported by the upper and lower dies. In a so-called post-in-well type vulcanizing press in which a shaping bladder housing well is provided in a surrounding and concentric relation to the central mechanism and the bladder is drawn into the well in a folded state, the lower clamp support portion moves below the lower die, so the above-noted downward internal pressure cannot be supported by the lower die and therefore it becomes necessary that a post member on the central mechanism side which supports the lower clamp portion be retained by another means. As this retaining means there is used, for example, a retaining pin which is inserted from the outside of the central mechanism, or a retaining spacer which is inserted similarly, or a latch mechanism capable of being opened and closed which is provided in the central mechanism and which is opened or closed to retain the post member, as will be described later.

A prior art central mechanism using a latch mechanism will now be described. What is illustrated in FIGS. 7, 8 and 9 is the central mechanism disclosed in Japanese Utility Model Laid-Open Publication No. 61997/83 filed by the applicant in the present case. The basic structure and latch mechanism in the said central mechanism are as follows.

A lower die 14 is fixedly mounted on a vulcanizer base 11 through a heat insulator 12 and a hot platen 13, (such being illustrated only partially because all of them are well known) and an upper die of a known structure (not shown) is disposed for opening and closing motions relative to the lower die 14. A green tire is indicated at 15 and an extensible and contractible bladder formed of rubber or any other suitable elastic material is indicated at 16. A housing well 2 of the central mechanism is vertically movably provided through a guide post 17 fixed in a central position of the lower die 14 and also through a lift means such as a knockout cylinder known in conventional tire vulcanizers and a link mechanism which connects a piston rod of said cylinder with the housing well 2. A lower bead ring 29 for supporting a lower bead portion of the green tire 15 is fitted on the outer periphery of an upper end of the housing well 2.

A support post 4 having at an upper end thereof a clamp ring hub 18 provided with a lower clamp 1 for the bladder 16 is provided through a central position of the housing well 2, namely, the press center, vertically movably through its slidable engagement with the inner surface of the well 2. Further, a center post 19 provided at an upper end with an upper clamp 5 for the bladder 16 is inserted centrally through the support post 4 vertically movably along the center bore of the support post 4 as a guide. To the clamp ring hub 18 is connected an inlet pipe 20 for steam or any other suitable hot pressure medium, which pressure medium can be supplied into the bladder 16 through a through hole 21. A hot pressure medium outlet passage 23 which communicates with the interior of the bladder 16 through a through hole 22 in the upper clamp 5 is formed through the center of the center post 19. A seal member between the center post 19 and the clamp ring hub 18 is indicated at 24, and a port 25 of the outlet passage 23 projects outwards from a notch 26 of the support post 4. Hydraulic cylinders are used as lift means for the posts 4 and 19 and, as illustrated in the drawing, a hydraulic lift cylinder 3 for the support post 4 and a like cylinder 6 for the center post 19 are both disposed below a partition wall 2a provided in an intermediate position of the housing well 2 in spaced relation to the posts 4 and 19 and in a built-in fashion. A piston rod 3a of the hydraulic lift cylinder 3 is connected through a connecting rod 27 to the clamp ring hub 18 side which is integral with the support post 4. On the other hand, a piston rod 6a of the hydraulic lift cylinder 6 is connected to a lower end of the center post 19 through a connecting portion 28. Since the lower clamp 1 of the bladder 16 and the lower bead ring 29 of the green tire 15 are separated, the bladder 16 can be drawn into the housing well 2 together with the upper and lower clamps 5 and 1 as will be described later. Therefore, a support mechanism using a latch 10 is provided for supporting the descent of the lower clamp 1 side caused by internal pressure during vulcanizing pressing for the green tire 15 under heating and pressure. More particularly, utilizing the partition wall 2a in the well 2, a pair of pin shafts 30 are opposedly provided rotatably and a pair of pinions 31, which are in mesh with each other, are mounted on the pin shafts 30. Further, a pair of latches 10 are attached to upper ends of the pin shafts 30 to hold therebetween a notched peripheral portion 4a of the support post 4. To one pin shaft 30 is connected an actuating link 33 which is driven by a piston rod 32a of a driving cylinder 32, whereby both latches 10 can be opened and closed to lock and unlock the support post 4. Further, a swivel-stop key 35 fixed to a bracket 34 provided by utilization of the partition wall 2a is engaged with the support post 4 only vartically movably through a notch 4b.

Such conventional central mechanism involves the following problems. As already known, the central mechanism itself is an assembled set, which is completed outside the vulcanizer in advance and then mounted to the base frame of the press in a central position of the lower die. In the foregoing mechanism in which pins or spacers are moved in and out, or the latch mechanism shown in FIGS. 5, 6 and 7 which comprises a pair of latches 10, driving cylinder 32 and actuating link 33, it is required to reassemble the mechanism after assembly and it is impossible to make assembly and adjustment from outside the vulcanizing press; besides, there are such disadvantages as an increase in the area occupied by the mechanism and the impossibility of obtaining a large effective stroke. The latch mechanism is superior to the pin or spacer in-out system, but the shape and size of the cylinder and link are extremely restricted because the driving cylinder 32 and the actuating link 33 are disposed planarly within the limited space in the well 2 and the latches 10 are opened and closed by a rotational motion. Moreover, only a short effective stroke is allowed for the piston rod of the cylinder and the moving radius of the link 33 becomes short, such that it is impossible to impart an exact and stable opening/closing motion to the latches 10. Further, since the hot pressure medium supply line as well as the center post and support post are disposed through the central mechanism, an effective utilization area is extremely restricted, thus imposing a great restriction on the design and assembly of the entire latch mechanism, and it is actually difficult to assemble and adjust of the mechanism.

Further, there arises heat propagation especially on the side of the upper portion of the central mechanism due to a thermal environment created by the hot pressure medium supplied into the bladder, heating means in the upper and lower dies and the hot pressure medium supplied into a dome which surrounds the upper and lower dies. In a convention construction in which the lower clamp side of the bladder is directly connected to a hydraulic cylinder, an undesirable influence is exerted on the cylinder side due to heating and such construction makes it difficult to adopt a heat progagation cut-off structure. Thus, hydraulic sealing and maintenance are extremely difficult, causing various difficulties. There are two types, in one of which the hydraulic cylinder as a main body of the central mechanism is provided at the center of the lower die vertically movably through a guide post, while in the other type the housing well as a main body of the central mechanism is provided in the guide post and the hydraulic cylinder is mounted in the well vertically movably. In both types, the hydraulic cylinders are required to be considerably long, thus leading to an increase in size of the central mechanism itself.

Moreover, it is difficult to effect heat insulation for the connection between the center post for vertical movement of the bladder upper clamp and the actuator as a drive source for the center post, and no consideration is given regarding the heat retention and insulation. Consequently, heat dissipation to the exterior and heat loss are large, and the temperature of the bladder lower portion and that of the lower bead ring portion become lower as compared with the respective upper portions, resulting in vulcanization of the portion concerned (lower portion of the tire) being apt to be delayed.

SUMMARY OF THE INVENTION

It is an object of the present invention to solve the above-mentioned problems, particularly the problems involved in the open/close latch type.

It is another object of the present invention to prevent the reduction of temperature at the bladder lower portion and lower bead ring portion by providing a heat insulator not only between partition walls which close the lower portion of a housing well but also in the connection between center post and actuator as well as around the housing well.

According to the present invention, in order to attain the above objects, a drive member is provided in a central mechanism so as to be movable in a vertical direction, namely, in parallel with the axis of the mechanism, as latch opening and closing means, whereby a latch opening/closing shaft is given a rotational motion positively and easily. More specifically, a latch opening/closing drive member is provided in the central mechanism so as to be vertically movable and a spiral block of the drive member is engaged with a spiral groove formed on the latch rotating shaft side.

Further, an actuator is connected to a lower portion of a center post through a connecting pin having a heat insulator; the lower portion of a housing well which surrounds a support post is divided in a vertical direction and closed with upper and lower partition walls which are connected to each other; a heat insulator is disposed between the partition walls; and a cylindrical heat insulating structure which surrounds the well is attached to the vulcanizer base.

BRIEF DESCRIPTION OF THE DRAWINGS

Various other objects, features and attendant advantages of the present invention will be more fully appeciated as the same becomes better understood from the following detailed description when considered in connection with the accompanying drawings in which like reference characters designate like or corresponding parts throughout the several views and wherein:

FIG. 2(A) is a rear longitudinal sectional thereof and FIG. 2(B) is a sectional view taken along line II—II of FIG. 2(A);

FIG. 6 is an explanatory view taken on line VI—VI of FIG. 5;

FIG. 7 is a front longitudinal sectional view of a central mechanism in a tire vulcanizing press according to the prior art;

FIG. 8 is a plan view in transverse section showing a principal portion of a latch opening/closing means used therein; and FIG. 9 is a plan view thereof.

DESCRIPTION OF THE PREFERRED EMBODIMENTS

An embodiment of the present invention will be described in detail hereinunder with reference to FIGS. 1 to 4.

Figure 1:
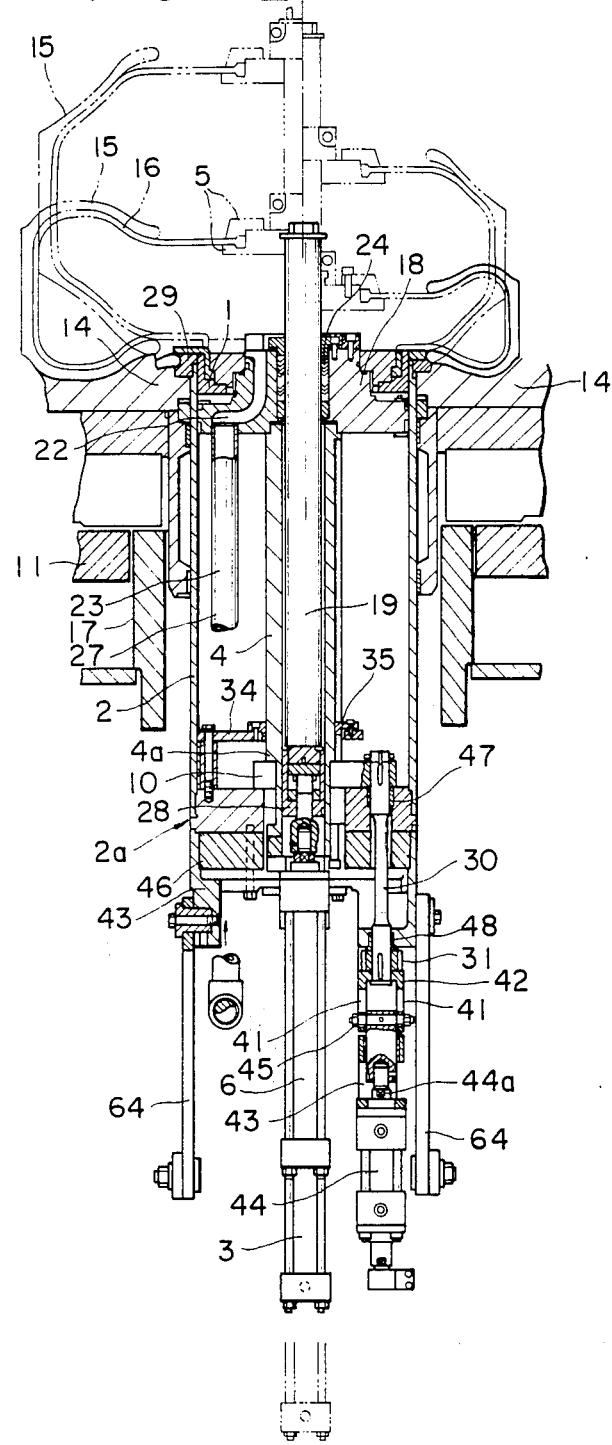
FIG. 1 is a side longitudinal sectional of the whole of a central mechanism in a tire vulcanizing press according to a first embodiment of the present invention.
Figure 3:
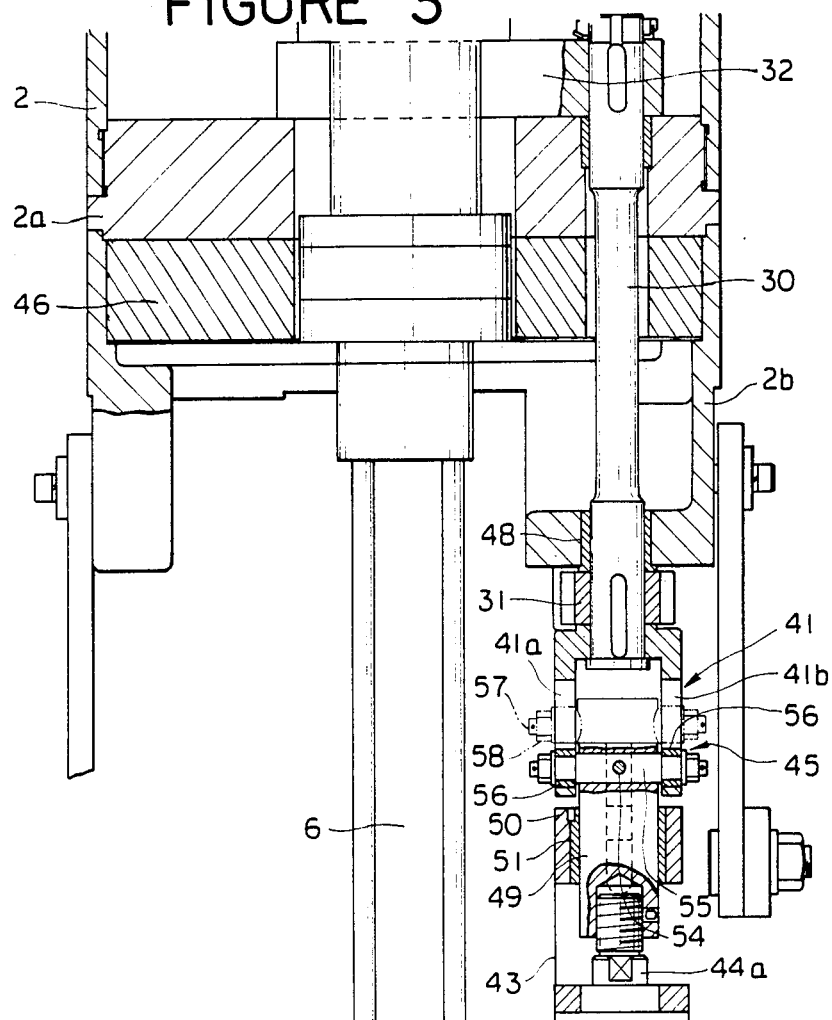
FIG. 3 is a front view partly in longitudinal section of the above mechanism.

As shown in FIGS. 1 and 2, in a tire vulcanizing press, a guide post 19 is fixed to a base 11 side in a central position of a lower die 17 and a bladder housing well 2 of a central mechanism is mounted in the post 17 vertically movably. A support post 4 hoving at an upper end thereof a clamp ring hub 18 provided with a lower clamp 1 for a bladder 16 is vertically provided, occupying a central position of the well 2. Further, a center post 9 having an upper clamp 5 for the bladder 6 at an upper end thereof is inserted through the center of the support post 4 also vertically movably, and an inlet pipe 20 and outlet pipe 23 for a hot pressure medium, e.g. steam, are connected to the clamp ring hub 18, whereby the hot pressure medium is supplied to and discharged from the interior of the bladder 16 via through holes 21 and 22. Hydraulic cylinders 3 and 6 for vertical movement of the support post 4 and center post 9 respectively are mounted below a partition wall 2a provided transversely of the well 2. A piston rod 3a of the cylinder 3 is connected to the clamp ring hub 18 side through a connecting rod 27, while a piston rod 6a of the cylinder 6 is directly connected to the center post 19 by means of a connecting portion 28. In the central mechanism of this type, in order to support the descent on the side of the lower clamp 1 caused by internal pressure of the hot pressure medium supplied into the bladder 16 during vulcanizing pressing for the green tire 15, a pair of pin shafts 30 are opposedly provided rotatably and a pair of pinions 31 mounted on the pin shafts 30 are brought into mesh with each other. Further, a pair of latches 10 are attached to upper ends of the pin shafts 30 so that the latches can be turned in directions opposite each other to grip and release a notched peripheral portion 4a formed in an intermediate part of the support post 4. In this connection, as shown in FIGS. 3 and 4, a guide block 42 having a spiral groove 41 formed on its outer peripheral surface is integrally provided with the lower end of one pin shaft 30, and a slide block 45 attached to a piston rod 44a of a vertical drive cylinder 44 which is provided at the lower end of the well 2, is slidably engaged with the spiral groove 41 of the guide block 42, whereby the gripping and releasing motions of the paired latches 10 are attained in the following manner. By moving the piston rod 44a of the drive cylinder 44 vertically, the slide block 45 of the rod 44a is also moved vertically in engagement with the spiral groove 41, so that the guide block 42 rotates either forward or reverse, causing its pin shaft 30 to turn simultaneously, and the other pin shaft 30 rotates interlockedly through the pinions 31, whereby the paired latches turn in directions opposite each other as indicated in solid line and chain line positions in FIG. 2 to the notched peripheral portion 4a like the solid lines and release it like the chain lines. This gripping action by the latches prevents the descent of the support post 4 against the internal pressure acting downward on the lower clamp 1 during vulcanizing pressing for the tire. Thus, according to this latch opening/closing device, a linear motion is converted to a rotational motion by the guide block 42 having the spiral groove 41 and the slide block 45 adapted to move vertically in engagement with the groove 41. Therefore, the entire device, including the drive cylinder 44 as a drive source for vertical movement, can be mounted compactly in a predetermined circle of a very small radius within a limited space in the central mechanism, thus facilitating its assembly, disassembly and adjustment outside the vulcanizing press. Moreover, there are provided a sufficiently large movement stroke and a force large enough to prevent the descent of the support post 4. Further, there is no obstacle to the additional presence of other members and mechanisms required in the central mechanism, and since main moving portions can be disposed below the partition wall 2a, there will be no thermal influence during vulcanization of the tire if a heat insulator 46 is attached to the partition wall 2a. Thus, great advantages can be obtained as compared with the latch opening/closing means described in connection with FIGS. 7, 8 and 9.

Figure 4B:
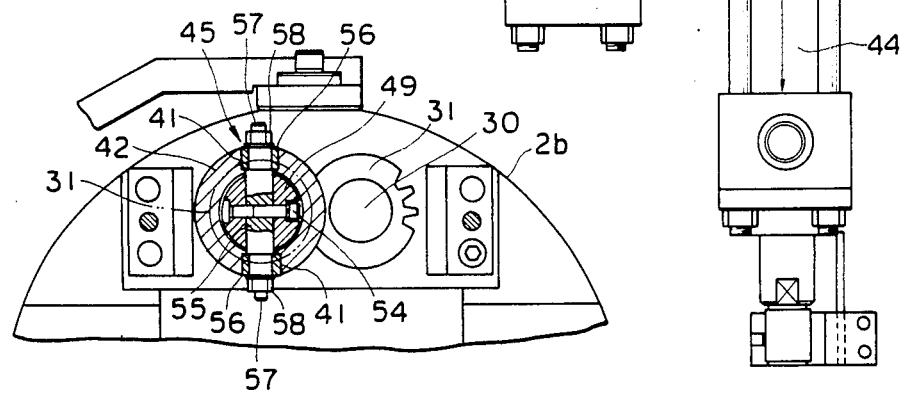
FIG. 4(A) is a side view thereof and FIG. 4(B) is a sectional view taken on line IV—IV of FIG. 4(A)
Figure 4A:
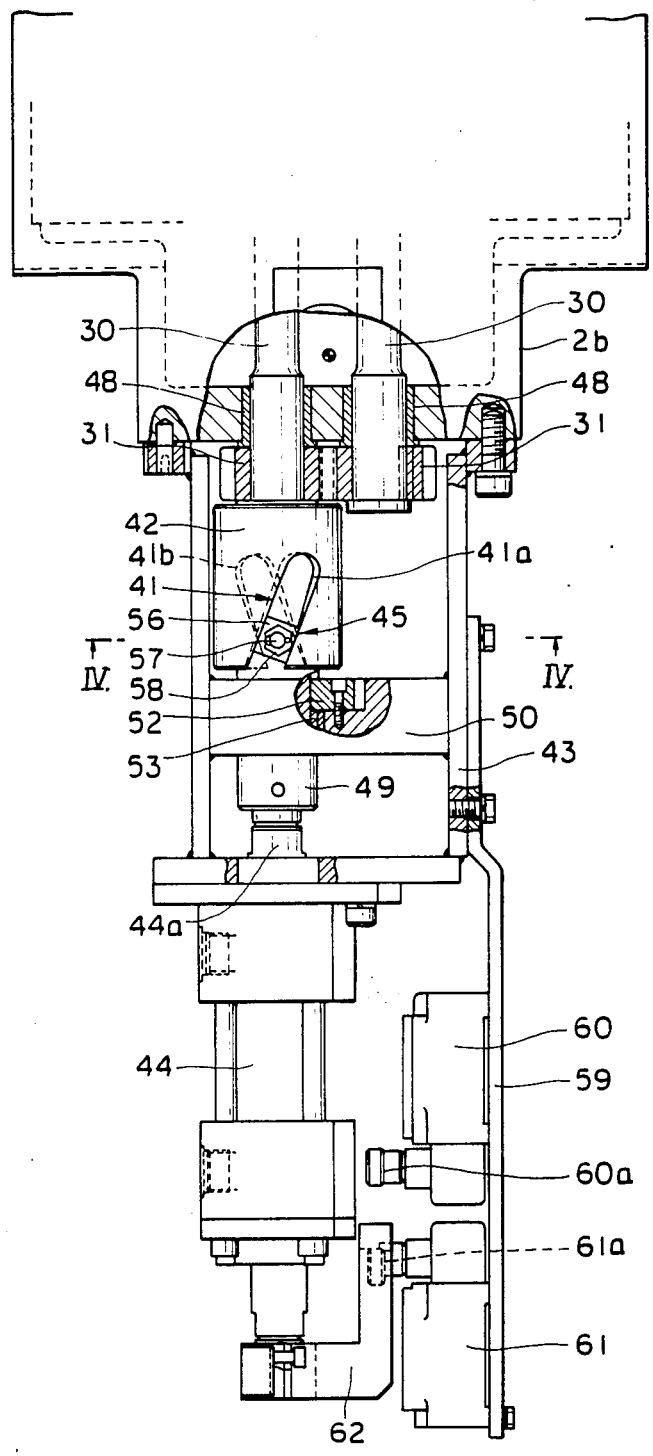

The central mechanism will now be described more specifically. The support post 4 which supports the lower clamp 1 is slidably fitted on the center post 19 which supports the upper clamp 5 for the bladder 16, and the hydraulic cylinders 6 and 3 for vertical movement of the posts 19 and 4 are mounted within the well 2 separately in spaced relation to both posts. The respective piston rods are vertically movably connected to the posts 19 and 4. This arrangement is superior in that the harmful influence caused by a direct connection with the high thermal environment is eliminated and the hydraulic cylinders convenient as vertical drive sources are kept away from the high thermal environment whereby a heat insulating structure is certain to be obtained easily, as compared with the conventional arrangement in which a hydraulic cylinder is provided as a support post in a central position of the lower die integrally with the lower clamp 1 and clamp ring hub 18. In addition, the partition wall 2a can be utilized as a mounting surface for the latches 10. In FIGS. 1 and 2(A), (B) the same reference numerals as utilizes in FIGS. 7, 8 and 9 represent the same members as in the latter. The embodiment shown in FIG. 1 is different from the construction shown in FIGS. 7-9 in that in the latter the central bore of the center post 19 is utilized as the hot pressure medium outlet passage 23, while in the former the outlet pipe 23 is connected as an independent member to the clamp ring hub 18 side without utilizing the center post 19. Other features are the same. Both woven common the fact that the pin shafts 30 are rotatably inserted through the partition wall 2a and a pair of latches 10 are attached to upper ends of the shafts 30. In this embodiment of the present invention, however, as shown in FIGS. 3, 4(A), 4(B) which is a sectional view taken on line IV—IV of FIG. 4(A), and also FIG. 1, upper portions of the pin shafts 30 extend through the partition wall 2a through bushings 47 and lower portions thereof are projected downward through the partition wall 2a and insulator 46 and rotatable supported by a support portion 2b through bushings 48 which support portion is formed at a lower end of the well 2. The pinions 31 engaged with each other are fixed with keys or the like to the pin shafts 30 at the lower surface of the support portion 2b. Further, the guide block 42 having the spiral groove 41 is fixed also with a key or the like to a lower part of the pinion 31 on one pin shaft 30 which serves as a drive shaft. The guide block 42 is in the form of a cylinder having a closed upper end, and a pair of spiral grooves 41a and 41b are formed as notched grooves in symmetrical positions on the outer peripheral surface of said cylinder. The hydraulic cylinder 44 is used as a vertically movable drive member for rotating the guide block 42. A bracket 43 is attached to the lower end of the support portion 2b of the well 2 and the drive cylinder 44 is vertically attached to the bracket 43 in parallel with the axis of the central mechanism. To a piston rod 44a of the cylinder 44 is integrally connected a rod 49 of a diameter which permits a loose slidable insertion thereof into the guide block 42. The rod 49 is intermediately slidably supported by a bearing portion 50 through a bushing 51, the bearing portion 50 being attached to the bracket 43. Further, a swivel-stop key 52 provided in the bearing portion 50 is brought into engagement with a groove 53 which is formed vertically on the peripheral side of the rod 49, and the slide block 45 is fixed to an upper end of the rod 49. The slide block 45 is transversely fitted through the center of the rod 49. A pin shaft-like block body 55 is fixed with a bolt 54 and slides 56, which are slidably engaged with the spiral grooves 41 of the guide block 42, are each fixedly attached to both ends of the block body 55 with a bolt portion 57 and a nut 58. The slides 56 are each in the form of a square and are in face contact with the spiral grooves 41, thereby ensuring stable operation and improved durability. This embodiment is only one example and it is apparent that other structures than the swivel-stopped rod 49, block body 55 and slide 56 can be adopted. In this embodiment, moreover, a panel 59 is attached to the lower end of the bracket 43 and limit switches 60 and 61 for stroke control and automatic control in the drive cylinder 44 are attached to the panel 59. Further, an operating piece 62 adapted to move vertically together with the piston rod 44a of the cylinder 44 is capable of coming into and out of contact with operating pieces 60a and 61a of the limit switches 60 and 61.

According to this embodiment, therefore, as the piston rod 44a of the drive cylinder 44 moves up or down, the rod 49 and slide block 45 also move together with the piston rod, so that the slides 56 of the block 45 move in engagement with the spiral grooves 41 of the guide block 42, whereby the guide block 42 is rotated forward or reverse, allowing the pin shaft 30 connected to the guide block 42 to rotate in the same direction. Consequently, through interlocking of the pinions 31, the paired latches 10 attached to the upper ends of the pin shafts 30 turn in directions opposite each other on the upper surface of the partition wall 2a, that is, in the closing direction, to grip the notched peripheral portion 4a of the support post 4, thereby preventing the descent of the post 4 caused by the internal pressure. When the latches are turned in the opening direction, the post 4 is movable vertically. The numeral 63 shown in FIGS. 1 and 2(A), (B) denotes a knockout lever of a known structure, which can be pivotally moved vertically by means of a cylinder or any other suitable drive source and which is connected to the well 2 through links 64, thereby effecting a vertical movement of the entire central mechanism.

Figure 5:
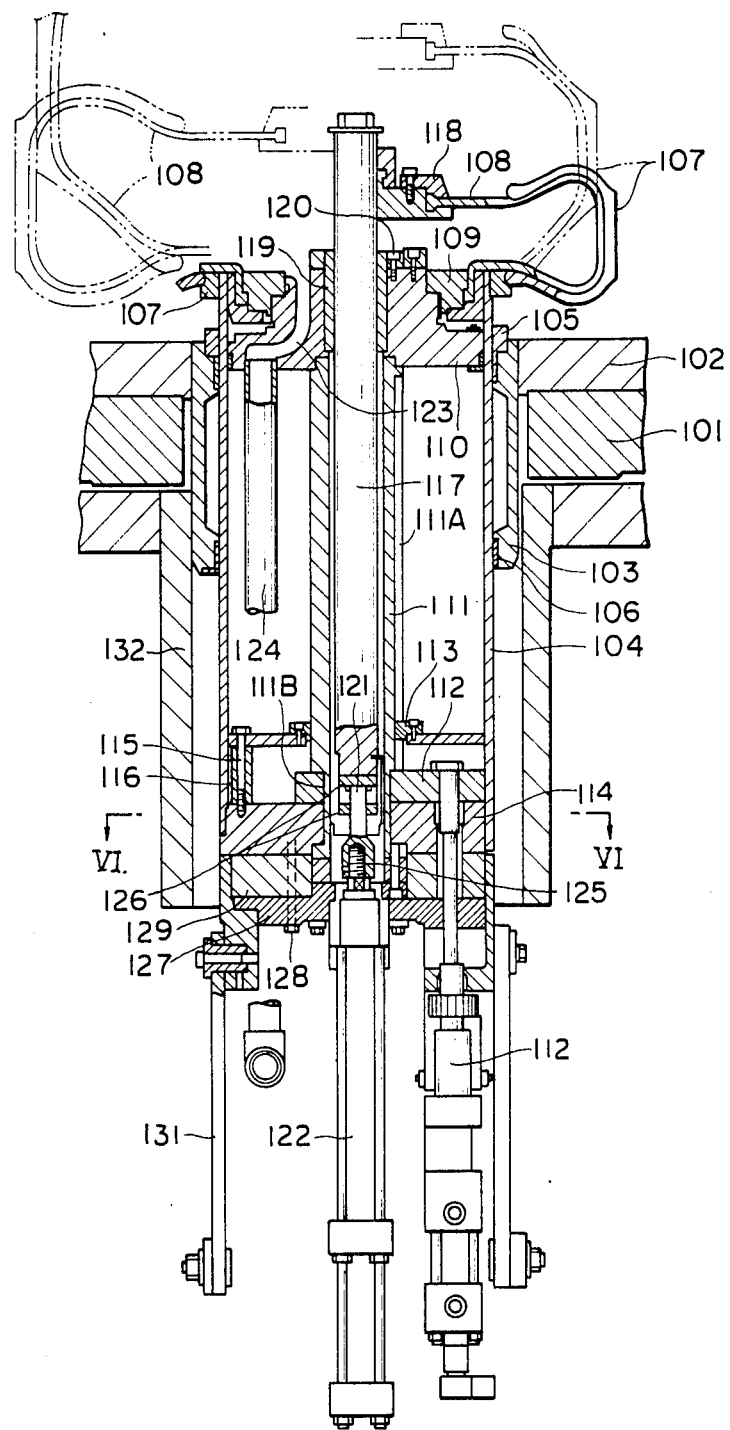
FIG. 5 is an elevational longitudinal sectional view of a central mechanism in a tire vulcanizing press according to a second embodiment of the present.

A second embodiment of the present invention will now be described with reference to FIGS. 5 and 6. A connecting pin 121 is connected to a piston rod of an actuator 122 through a screw structure 125 and it is connected at an opposite end thereof to a lower end face of a center post 117 through a heat insulator 126 such as FRP (fiber-reinforced plastic). A partition wall 114 is fixedly fitted in the lower portion of a housing well 104 to close the well interior from the exterior, and another partition wall 127 is attached to the partition wall 114 with bolts 128 or the like in a vertically spaced relation to each other. The space between the partitions walls 114 and 127 is filled with a heat insulator 129 such as glass wool. Thus, the lower portion of the well 104 which surrounds a support post 111 is closed with the upper and lower partition walls 114 and 127 which are interconnected in a vertically spaced relation, and the space between both partition walls is filled with the heat insulator 129. Consequently, due to such a temperature difference as about 160° C. as the temperature in a vulcanizing press region such as a die device on a platen 102, an internal temperature of 130° C. in the lower portion of the well 104 and an outside temperature of 60° C., the temperature of the lower portion in the vulcanizing press attempts to fall through heat dissipation, but this is prevented by the heat insulators 126 and 129. The joint faces of the upper and lower partition walls 114 and 127 are fitted together by a spigot structure as shown in FIG. 5 and are contacted with each other partially in the circumferential direction in a radial arrangement as indicated at 130 in FIG. 6. At the other portions such are not in contact with each other. Thus, the propagation at the portions 130 of the joint faces where both metals contact each other is kept to a minimum.

Numeral 131 denotes a lift link mechanism for moving the whole of the well 104 vertically. Numeral 132 denotes a cylindrical heat insulating structure 132 which surrounds the well 104 throughout the length of the well. The heat insulating structure 132 is attached to the base 101 side together with a heat insulator 133 which is attached to the lower surface of the base 101. Where the well 104 is of a vertically movable type as in this embodiment, the cylindrical heat insulating structure 132 is formed with a slit extending upward from a lower end thereof to allow the vertical movement of the lift link mechanism 131. Where the well 104 is a fixed type well, such slit is not needed. In any case, a radially outward dissipation of heat from the well 104 is prevented by the cylindrical heat insulating structure 132 formed of a heat insulator having glass wool in a sandwich fashion.

Thus the present invention has various advantages as compared with the conventional central mechanism. In the present invention, the guide block 142 is connected to one pin shaft 30 which serves as drive shaft for opening and closing a pair of latches 110 and the slide block 145 connected to the vertically movable piston rod 144a of the drive cylinder 144 is brought into engagement with the spiral groove 141 in the guide block 142 to convert a linear motion into a rotational motion. Therefore, the cylinder 144 as a drive can be disposed vertically at the lower end of the well 102, that is, it can be mounted compactly in a certain circle of a very small radius within a limited allowable space in the central mechanism. Moreover, its disassembly, adjustment and assembly integral with the central mechanism can be accomplished easily outside the press, and there is obtained a sufficiently strong and large effective cylinder stroke, thus ensuring stable opening and closing of the latches and completely preventing the descent of the lower clamp portion of the bladder. Additionally, since the structure for converting a linear motion of the cylinder into a rotational motion is attained by the spiral groove 141 and the slide block 145 adapted to move vertically in engagement with the spiral groove, not only it is extremely simplified as compared with the structure utilizing a screw or the like, but also a stable and rapid motion is ensured. This advantage is enhanced by using a slide block shape as in this embodiment. And there is no fear of an obstacle to the mounting of the other members and mechanisms in the central mechanism, so coupled with the freedom of assembly, disassembly and adjustment at the outside of the press, there can be attained a great improvement of the latch opening/closing means in the central mechanism.

Further, the heat dissipation from the central portion of the press to the exterior can be prevented by the heat insulator 126 provided in the portion where the connecting pin 121 for connection between the actuator 122 and the bladder mounting center post 117 is mounted. Moreover, since the partition walls 114 and 127 are disposed in vertically spaced relation to each other in the lower portion of the well 104 to close the latter and the heat insulator 129 is disposed in the space therebetween the heat dissipation from the lower portion of the well 104 is thereby prevented. Additionally, the dissipation of heat in a radially outward direction of the well 104 is also prevented by the cylindrical heat insulating structure 132 provided around the well.

Consequently, the heat insulation and retention in the central mechanism of the tire vulcanizing press can be attained to a satisfactory extent, thus ensuring a uniform temperature distribution throughout the die equipment which is important in the vulcanizing pressing for a tire, and thereby permitting a satisfactory execution of the tire pressing work. In addition, the life of oil can be improved because the drive members such as the actuator 122 can be sealed completely.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A central mechanism in a tire vulcanizing press, comprising:
    a shaping bladder disposed in a central position of a lower die;
    means for supplying a hot pressure medium into said bladder;
    a center post for supporting an upper clamp for said bladder;
    a support post for supporting a lower clamp for said bladder, wherein said center post is vertically movable and positioned within said support post;
    drive means connected to said posts for vertically independently moving each of said posts;
    latch means for engaging said support post to prevent descent of the support post during vulcanizing pressing for the tire and for disengaging from said support post to allow the descent of the latter;
    means for driving said latch means in opening and closing directions relative to said support post, said latch driving means comprising drive means movable along a vertical axis, means for converting a vertical linear motion of said drive means into a rotational motion around the vertical axis and means for transmitting a thus-obtained rotational motion to said latch means.

2. A central mechanism in a tire vulcanizing press according to claim 1, wherein said means for converting the vertical linear motion into the rotational motion comprises a slide block provided on the side of said vertically moving drive means and a spiral groove provided on the side of said rotational motion transmitting means, said slide block and said spiral groove being engaged with each other.

3. A central mechanism in a tire vulcanizing press, comprising:
    a shaping bladder disposed in a central position of a lower die;
    means for supplying a hot pressure medium into said bladder;
    a center post for supporting an upper clamp for said bladder;
    a support post for supporting a lower clamp for said bladder, wherein said center post is vertically movable and positioned within said support post; and
    drive means connected to said posts for independently vertically moving each of said posts wherein said drive means is connected to a lower portion of said center post through a connecting pin having a heat insulator, a lower portion of a housing well surrounding said support post being closed with two upper and lower partition walls interconnected in a vertically spaced relation with each other, a heat insulator located in a space between said partition walls, and a cylindrical heat insulating structure surrounding said housing well and attaching to the base side of the vulcanizing press.

* * * * *